(12) United States Patent
Zou et al.

(10) Patent No.: US 9,307,550 B2
(45) Date of Patent: Apr. 5, 2016

(54) EVOLVED NODE B CONTROLLED CENTRALIZED RESOURCE REUSE FOR DEVICE-TO-DEVICE AND CELLULAR USERS

(75) Inventors: Wei Zou, Shanghai (CN); Zhenhong Li, Shanghai (CN); Haifeng Wang, Shanghai (CN); Gang Wu, Shanghai (CN); Tao Chen, Espoo (FI)

(73) Assignee: NOKIA TECHNOLOGIES OY, ESPOO (FI)

( * ) Notice: Subject to any disclaimer, the term of this patent is extended or adjusted under 35 U.S.C. 154(b) by 98 days.

(21) Appl. No.: 13/521,349

(22) PCT Filed: Jan. 19, 2010

(86) PCT No.: PCT/CN2010/070252
§ 371 (c)(1),
(2), (4) Date: Jul. 10, 2012

(87) PCT Pub. No.: WO2011/088609
PCT Pub. Date: Jul. 28, 2011

(65) Prior Publication Data
US 2013/0012221 A1    Jan. 10, 2013

(51) Int. Cl.
*H04W 72/10* (2009.01)
*H04W 72/04* (2009.01)
*H04W 76/02* (2009.01)

(52) U.S. Cl.
CPC .......... *H04W 72/10* (2013.01); *H04W 72/0406* (2013.01); *H04W 76/023* (2013.01)

(58) Field of Classification Search
CPC .................................................... H04W 74/002
USPC ........................................................ 455/452.1
See application file for complete search history.

(56) References Cited

U.S. PATENT DOCUMENTS

| 8,107,883 | B2 | 1/2012 | Peng et al. |
| 2007/0189205 | A1* | 8/2007 | Terry et al. ..................... 370/328 |
| 2008/0025232 | A1 | 1/2008 | Martinez et al. |

(Continued)

FOREIGN PATENT DOCUMENTS

| CN | 1808961 A | 7/2006 |
| CN | 1969511 A | 5/2007 |

(Continued)

OTHER PUBLICATIONS

International Search Report and Written Opinion received for corresponding International Patent Application No. PCT/CN2010/070252, dated Nov. 4, 2010, 11 pages.

(Continued)

*Primary Examiner* — Kwasi Karikari
(74) *Attorney, Agent, or Firm* — Squire Patton Boggs (US) LLP (57) ABSTRACT

Device-to-device (D2D) communication is one alternative to communication between devices through a radio access network. One interesting D2D communication method is reuse-mode D2D, where D2D nodes communicate with each other using the same uplink (UL) radio resource that is being used by some other cellular user equipment(s) (UEs). In other words, the UL cellular resources occupied by cellular UEs are reused by D2D nodes in their short-range communications. Centralized control of D2D communication can be performed by appropriate signaling between a D2D-capable UE and an evolved Node B (eNB).

17 Claims, 7 Drawing Sheets

(56) References Cited

U.S. PATENT DOCUMENTS

| | | | |
|---|---|---|---|
| 2009/0196230 A1* | 8/2009 | Kim | H04W 74/002 370/328 |
| 2009/0325625 A1 | 12/2009 | Hugl et al. | |
| 2010/0093364 A1 | 4/2010 | Ribeiro et al. | |
| 2010/0291959 A1* | 11/2010 | Inaida | 455/513 |
| 2012/0290650 A1* | 11/2012 | Montuno et al. | 709/204 |

FOREIGN PATENT DOCUMENTS

| | | |
|---|---|---|
| EP | 1990951 A1 | 11/2008 |
| WO | 2006/049251 A1 | 5/2006 |
| WO | 2009/138820 A1 | 11/2009 |

OTHER PUBLICATIONS

Office Action dated Mar. 14, 2014, issued in corresponding Indonesian patent application No. W-00201202369.

Chinese Office Action application No. 2010800603189 dated Oct. 23, 2015.

Office Action dated Apr. 9, 2015, issued in corresponding CN Patent Application No. 201080060318.9 (with English translation).

Chinese Office Action dated Jul. 28, 2014, for corresponding Chinese Patent Application No. 201080060318.9.

* cited by examiner of the UE ID in the list

| List Type | Length | UE ID List |

(a) receiving/transmission
(b) D2D direction detailed list

EVOLVED NODE B CONTROLLED CENTRALIZED RESOURCE REUSE FOR DEVICE-TO-DEVICE AND CELLULAR USERS

RELATED APPLICATION

This application was originally filed as PCT Application No. PCT/CN2010/070252 filed Jan. 19, 2010.

BACKGROUND

1. Field

Device-to-device. (D2D) communication is one alternative to communication between devices through a radio access network. One interesting D2D communication method is reuse-mode D2D, where D2D nodes communicate with each other using the same uplink (UL) radio resource that is being used by some other cellular user equipment(s) (UEs). In other words, the UL cellular resources occupied by cellular UEs are reused by D2D nodes in their short-range communications.

2. Description of the Related Art

One way to decide which cellular resource can be reused in a reuse D2D link is by each D2D pair themselves. In that approach, each D2D candidate first gets the UL scheduling information from the eNB and measures the corresponding UL channels. Then, the D2D candidate itself finds the cellular UEs whose resource allocation can be reused in its future D2D communication. After that, related information is exchange between a D2D pair, and a final list of reused cellular UEs (UEs whose resource allocation can be reused in their D2D communication) is decided. That D2D pair then starts monitoring the eNB's scheduling again. Once a cellular UE in the decided list is allocated a radio resource, that D2D pair will reuse that part of radio resource to perform their short-range D2D communication.

As each D2D pair decides which resource to reuse independently, eNB has no information on the existence of D2D pair at all. Therefore, the eNB cannot consider the D2D communications in its radio resource allocation. As a result, D2D UEs can, in this approach, only communicate with each other when a resource suitable to be reused comes along. Therefore, that distributed reuse-mode D2D can only support a service opportunistically without any guarantee of availability.

Additionally, if two reuse-D2D pairs start their communication simultaneously, resource contention may occur if both D2D pairs decide to reuse the resources of the same cellular UE. To overcome this problem, a 2-way handshake mechanism can be employed similar to RTS/CTS/Data/ACK mechanism in WLAN systems. In an RTS/CTS handshake, a reusable list of cellular UE resources can be exchanged between the D2D pair and a final reuse list can be decided for each D2D communication direction. If a nearby D2D pair hears the transmitted RTS signal, it will postpone its RTS/CTS exchange and perform interference measurement a second time. However, it should be noted that, in this approach, the RTS/CTS message cannot be exchanged by reusing the cellular resource. This is because resource reusable in a cell for a specified D2D pair is not fixed for all time. It changes with the scheduling of cellular UEs, positions of cellular UEs, positions of D2D UEs, etc. Hence, it may be that there will be an absence of information as to which resources can be reused for the delivery of such messages. Even if there were a dedicated orthogonal channel for RTS/CTS exchanges, RTS/CTS collision between two D2D pairs may significantly postpone the link setup of reuse-mode D2D links.

In the approaches above, the eNB has no awareness of the reuse-D2D links. Thus, the eNB is unable to assist operators in imposing a service charge for reuse D2D communications.

SUMMARY

A method according to an embodiment of the present invention includes determining whether to grant reuse resources to a device-to-device connection based on reviewing by priority at least one request for device-to-device connection resources. The reuse resources include at least one uplink channel to be used by a user equipment during a time period. The method also includes initiating transmission of a notification of device-to-device reusable resources in response to the at least one request. The notification contains configuration information to identify the reusable resources available during the time period.

Another method according to an embodiment of the present invention includes initiating a request for reuse resources for a device-to-device connection. The method also includes analyzing a notification received responsive to the request and based on a priority to determine reusable resources, wherein the notification includes a list of user equipment. Initiating a device-to-device connection based on analysis of the notification is also a part of the method.

A further embodiment of the present invention is an apparatus including at least one memory including computer program code and at least one processor. The at least one memory and the computer program code are configured to, with the at least one processor, cause the apparatus at least to determine whether to grant reuse resources to a device-to-device connection based on reviewing by priority at least one request for device-to-device connection resources. The reuse resources include at least one uplink channel to be used by a user equipment during a time period. The at least one memory and the computer program code are also configured to, with the at least one processor, cause the apparatus at least to initiate transmission of a notification of device-to-device reusable resources in response to the at least one request. The notification contains configuration information to identify the reusable resources available during the time period.

An additional embodiment of the present invention is an apparatus including at least one memory including computer program code and at least one processor. The at least one memory and the computer program code are configured to, with the at least one processor, cause the apparatus at least to initiate a request for reuse resources for a device-to-device connection. The at least one memory and the computer program code are also configured to, with the at least one processor, cause the apparatus at least to analyze a notification received responsive to the request and based on a priority to determine reusable resources, wherein the notification includes a list of user equipment. The at least one memory and the computer program code are further configured to, with the at least one processor, cause the apparatus at least to initiate a device-to-device connection based on analysis of the notification.

An apparatus according to another embodiment of the present invention includes determining means for determining whether to grant reuse resources to a device-to-device connection based on reviewing by priority at least one request for device-to-device connection resources. The reuse resources include at least one uplink channel to be used by a user equipment during a time period. The apparatus also includes transmission means for initiating transmission of a notification of device-to-device reusable resources in response to the at least one request. The notification contains configuration information to identify the reusable resources available during the time period.

An apparatus according to a further embodiment of the present invention includes requesting means for initiating a request for reuse resources for a device-to-device connection. The apparatus also includes analyzing means for analyzing a notification received responsive to the request and based on a priority to determine reusable resources, wherein the notification includes a list of user equipment. Connection means for initiating a device-to-device connection based on analysis of the notification are also included in the apparatus.

Another embodiment of the present invention is a computer-readable medium, encoded with instructions that, when executed in hardware, perform a process. The process includes determining whether to grant reuse resources to a device-to-device connection based on reviewing by priority at least one request for device-to-device connection resources. The reuse resources include at least one uplink channel to be used by a user equipment during a time period. The process also includes initiating transmission of a notification of device-to-device reusable resources in response to the at least one request. The notification contains configuration information to identify the reusable resources available during the time period.

An additional embodiment of the present invention is a computer-readable medium, encoded with instructions that, when executed in hardware, perform a process. The process includes initiating a request for reuse resources for a device-to-device connection. Analyzing a notification received responsive to the request and based on a priority to determine reusable resources, wherein the notification includes a list of user equipment is also included in the process. The process further includes initiating a device-to-device connection based on analysis of the notification.

BRIEF DESCRIPTION OF THE DRAWINGS

For proper understanding of the invention, reference should be made to the accompanying drawings, wherein.

DETAILED DESCRIPTION OF THE PREFERRED EMBODIMENT(S)

Device-to-device (D2D) communication may have value for third generation (3G) and beyond-3G communication networks. Reuse-mode D2D, in particular, may enhance such networks.

For D2D peers close to each other, such a reuse-mode D2D communication method is attractive because a low-power D2D link does not noticeably affect the uplink (UL) operation of concurrent cellular UEs. As the transmission power in short-range D2D communication is very small, the interference from transmitting D2D peer to the eNB can be neglected for purposes of calculation. Consequently, cellular-to-D2D interference is of great interest in D2D.

When a cellular UE is transmitting traffic to the enhanced Node B (eNB), its assigned radio resource can be reused by a short-range reuse D2D link if the receiving D2D node (generally it is a cellular UE as well, though this is not a requirement) is far away from that transmitting UE. Due to the large distance between them, interference from that cellular UE to the receiving D2D node becomes very small. However, if that cellular UE (whose resources are being considered for reuse) is near to (or not far enough away from) the receiving D2D node, the resources used by that cellular UE will not be allowed to be reused by the receiving D2D node. To distinguish these two cases, measurement can be performed at a receiving D2D node. The interference measurements can be performed by D2D nodes, and the results can be reported to eNB in any format.

In view of the interference measurement(s), each D2D node generates a list of cellular UEs whose resources can be reused in its D2D communication. Cellular UEs near to the D2D node can be excluded from that list due to their relatively large interference to the D2D link. The remaining problem is how to define a reuse-D2D communication based on that. That is: which cellular resource (or resources belonging to which cellular UE) will be reused by a specified D2D link, and how to make the related information available to each D2D peer.

Reuse-D2D communication can enlarge system capacity with minimal cost. One reason for this low cost is that the cellular link can still run simultaneously without being affected, and the network resources are not required for signaling the D2D communications. Thus, operator may want to encourage the usage of D2D, if they find it profitable.

In certain embodiments of the invention, all of the UEs involved in D2D communications (referred to as D2D UEs) are also cellular UEs, and in eNB coverage. In such embodiments, the D2D UEs have also been paired each other. Two D2D UEs can be paired when an eNB finds that there is a traffic request between them and the setup of a reuse D2D link is possible. Additionally, interference measurements (including D2D-reuse-related measurements) have been performed by D2D UEs, and the results have been reported to eNB in these embodiments.

Once such measurements and pairing have taken place, the eNB can act as the central controller of reuse D2D communications. Hence, when simultaneous D2D requests arrive, the eNB can consider all the requests and decide the reusable cellular UEs for each D2D link. One simple method is to select one D2D link to set up and postpone the others (similar to the effect of RTS collision). In some other embodiments, however, several D2D links can even be set up simultaneously using orthogonal reuse lists (i.e. cellular UEs in those reuse lists are different). This may provide much greater flexibility than the RTS/CTS mechanism.

To realize such central control, the eNB can be responsible to inform each D2D pair of the available permitted reusable resources by a Radio Resource Control (RRC) message (a "D2D-reusable UE list" message) after collecting and analyzing the measurement reports from D2D UEs. As a D2D UE is also a cellular UE, the measurement report can be delivered from D2D UEs to eNB by their cellular link. In the downlink direction, eNB can then send a "D2D-reusable UE list" message to each D2D UE (or each D2D pair in a multicast signaling case) to indicate the reusable cellular resource at each D2D UE and its desired actions (either D2D receiving or transmission). By this centralized reuse control mechanism, contention between different reuse-D2D links (i.e. the different D2D links reusing the same radio resource) can be avoided, and an RTS/CTS-like handshake is not needed. Hence, RTS/CTS collision can also be avoided. Moreover, service charge for reuse D2D communications could be easily implemented due to the awareness of reuse D2D links at eNB.

As a further enhancement of centrally controlled reuse D2D, a newly-defined "D2D reuse importance level" message (or field) can be requested from a D2D-capable UE to the eNB in the initial reuse-D2D link setup phase. The eNB can then improve its resource allocation according to the value of "D2D reuse importance level" so that the reuse-D2D communications can be enhanced in different levels to provide differentiated service guarantees for reuse D2D links.

Notification of a D2D-Reusable UE List from an eNB with D2D Direction Indication:

The eNB can send a "D2D-reusable UE list" message to each D2D UE (or each pair of D2D UEs in a multicast signaling case) through the cellular link. This message can contain not only the identities of those cellular UEs (for example, cell radio network temporary identifier (C-RNTI) in a Long Term Evolution (LTE) system) whose radio resource can be reused by the notified D2D UE (or D2D pair), but also the information on desired D2D actions (either D2D receiving or transmission) at each D2D peer. Based on the notified reusable list of cellular UEs, D2D UEs can know which part of the resource can be reused in its D2D communication, after decoding the cellular scheduling information broadcasted from eNB. When a cellular UE in the reuse list is allocated a radio resource for transmitting its UL traffic, the D2D UE can reuse that part of the resource for D2D transmission (or receiving). Detailed formats of "D2D-reusable UE list" message are discussed below, and its contents are explained for both unicast and multicast signaling cases.

After the analysis of measurement results, eNB can decide whether a D2D UE can communicate with its D2D peer when a cellular UE is performing UL transmissions. Based on measurement reports from D2D UEs, if eNB find that the interference from a cellular UE at a D2D UE is smaller than a pre-defined threshold (for example when the D2D UE is far away from the cellular UE and the power of received interference is very low), the eNB can put that cellular UE into the "reuse set" of that D2D UE. Alternatively, a D2D UE can decide a "reuse set" by itself and report the "reuse set" to eNB. The decision at a D2D UE can base on its measurement results and a predefined threshold (this threshold can also be notified by the eNB through a broadcast message in advance).

Then, by analyzing the "reuse sets" of both peers in each D2D pair together with the bandwidth request in each D2D direction, the eNB can create a "D2D-reusable UE list" for each D2D link. If a cellular UE is contained in that list, the D2D link can reuse its resource. It should be noted that each list here may only define the unidirectional D2D communication from one D2D UE to its D2D peer. For the reverse D2D direction between the same D2D pair, another "D2D-reusable UE list" can be determined in the same way. The decision can be based on the "reuse set" of each D2D peer, QoS parameters of cellular UEs in the "reuse set", or a traffic request of the D2D link, etc.

Figure 1:
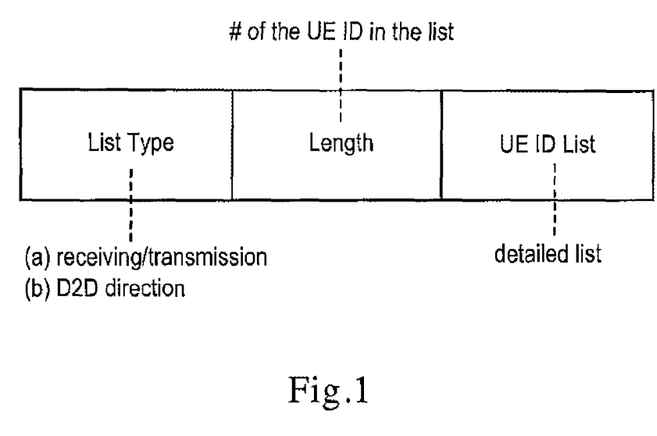
FIG. 1 illustrates an example format of a "D2D-reusable UE list" message.

After that, eNB can start notifying the "D2D-reusable UE list" to both D2D peers through their cellular signaling channels. FIG. 1 illustrates a format example for a "D2D-reusable UE list" message, where "List Type" defines the D2D communication actions, "Length" defines the number of UE ID in the following list, and "UE ID List" gives a list of identities of the reused cellular UEs.

If the defined message is unicast to each D2D peer, "List Type" can be used to define the detailed action for the notified D2D node. For example, "0" can represent a D2D receiving action while "1" represents the D2D transmission action. Because the message is unicast to each D2D peer, two messages with the same "Length" and "UE ID List" fields (but different "List Type" field) can be separately sent to the two D2D peers (respectively) to define a unidirectional D2D communication. In contrast, if the "D2D-reusable UE list" message is multicast to both D2D UEs, only one message may be sent by the eNB and both D2D peers may need to know how to perform the D2D communication after receiving it.

In this case, "List Type" cannot define the detailed action of each D2D node directly, but only indicate a D2D direction. For example, "0" can represent the direction from caller to callee, and "1" can represent the reverse direction. Because each D2D UE has already known its role (either caller or callee) in the D2D communication, the D2D caller can reuse the included notified list for transmission if "List Type" is "0". Meanwhile, the D2D callee can reuse the same list for D2D receiving. Hence, 1-bit "List Type" can be enough to define the detailed D2D actions in both unicast and multicast signaling cases.

After the D2D UE gets its reuse lists and D2D action indication, it can monitor the control channel (for example physical downlink common control channel (PDCCH) in LTE) to get the knowledge of the resource allocations to the cellular UEs in its "D2D-reusable UE list", and perform the corresponding D2D transmission/receiving actions reusing the allocated cellular resources.

It should be noted that the approach of a reusable UE list simply being generated in each D2D UE is distinguishable from the approach of eNB notification signaling because each D2D UE decides a reusable UE list by itself unless the eNB notification signaling is provided. In addition, by notifying reusable D2D UEs from eNB, resource contention of two reuse D2D candidates can be completely avoided because the eNB can perform the coordination for the D2D UEs. Hence, an RTS/CTS-like handshake can be obviated.

Reuse Importance Level from D2D UE for Joint Resource Allocation of Cellular and Reuse-D2D Links:

In order to overcome shortage of opportunistic reuse (or for other purposes), a factor referred to as "D2D reuse importance level" can be introduced to improve eNB resource allocation, so that a reuse D2D link can be jointly considered together with the cellular UEs. In this approach, the reuse D2D link can be enhanced to support some high-level services.

At the initial stage of a D2D setup, a reuse D2D UE can send a proposal of "D2D reuse importance level" to eNB, either together with the call setup request, or through an independent MAC message. Once eNB receive it, it will use different strategies in its resource allocation according to the received "D2D reuse importance level" so that the reuse-D2D link can be jointed considered in a different priority compared with cellular links. Correspondingly, a different service charge rate can be applied for that reuse-D2D communication. The may be at least two typical resource allocation strategies under a reuse D2D scenario.

In a first resource allocation strategy, there may be no consideration of reuse D2D links (reuse importance level=0). In other words, the eNB using such a strategy will not consider a reuse-D2D link at all in its resource allocation. In this case, only opportunistic communication can be supported in the reuse-D2D links. That is, D2D UEs can only communicate with each other when a resource suitable to be reused comes.

In a second resource allocation strategy, there may be different levels of joint consideration of both cellular links and reuse D2D links (reuse importance level greater than 0). In this strategy, an eNB can try to adjust its resource allocation of cellular UEs, so that both cellular and D2D links can be satisfied in different levels. For example, an eNB can intentionally allocate more resources to the cellular UEs in the "D2D-reusable UE list" of a D2D link, so that the D2D link has more resources to reuse. In this case, the radio resources can be actually allocated to the reuse D2D link, although one or more cellular UEs in its D2D-reusable UE list can be simultaneously served. In an extreme case of a reuse importance level >1, the reuse D2D link should even be satisfied in a higher priority than cellular links. This can happen when reuse D2D is more preferred by the consumer. For example, the operator may charge less for D2D operation due to the lower OPEX. Alternatively, the consumer may like to operate in D2D mode with different importance levels for cost saving with acceptable service quality.

It should be noted that, although "D2D reuse importance level" can be any non-negative value, its range may conveniently be arranged to run between 0 and 2 (with 0 and 1 as typical values). This range can also be quantized into several levels. In such a method, reuse-D2D links are classified into different categories with different importance levels compared to cellular links.

In certain embodiments with the above classifications in place, at the eNB reuse D2D links with an importance level greater than 1 are considered first, then the cellular links and the reuse D2D links with an importance level equal to 1. Finally, reuse D2D links with an importance level less than 1 can be taken into account. Thus, the importance level can help to ensure that those links of greatest importance are satisfied first.

Besides weighting resource allocation for different D2D links, "D2D reuse importance level" can also be used in the reuse-list decision at eNB. For example, if two D2D pairs are requesting D2D setup, the one with higher "D2D reuse importance level" will get a larger number of cellular UEs to reuse. As the eNB can have knowledge of both cellular UEs' and D2D UEs' traffic request, it is easy to decide a reasonable reuse list for each D2D link.

To realize all kinds of D2D-reuse considerations, an enhanced proportional fairness scheduling algorithm, taking into account both cellular and D2D links, is discussed below.

Reuse Importance Level from D2D UE for Joint Resource Allocation of Cellular and Reuse-D2D Links:

Although D2D UEs can reuse the resources of a cellular UE in their D2D communications, a passive reuse mode may not be good enough for high-level services. A passive reuse mode exists when the eNB only considers cellular UEs in its resource allocation and D2D UE can only opportunistically communicate with each other when a resource suitable to be reused comes along. A factor, referred to as "D2D reuse importance level," can improve the eNB resource allocation so that reuse D2D link can be jointly considered together with the cellular UEs. This factor, and several resource allocation strategies for its use, are discussed above.

Figure 2:
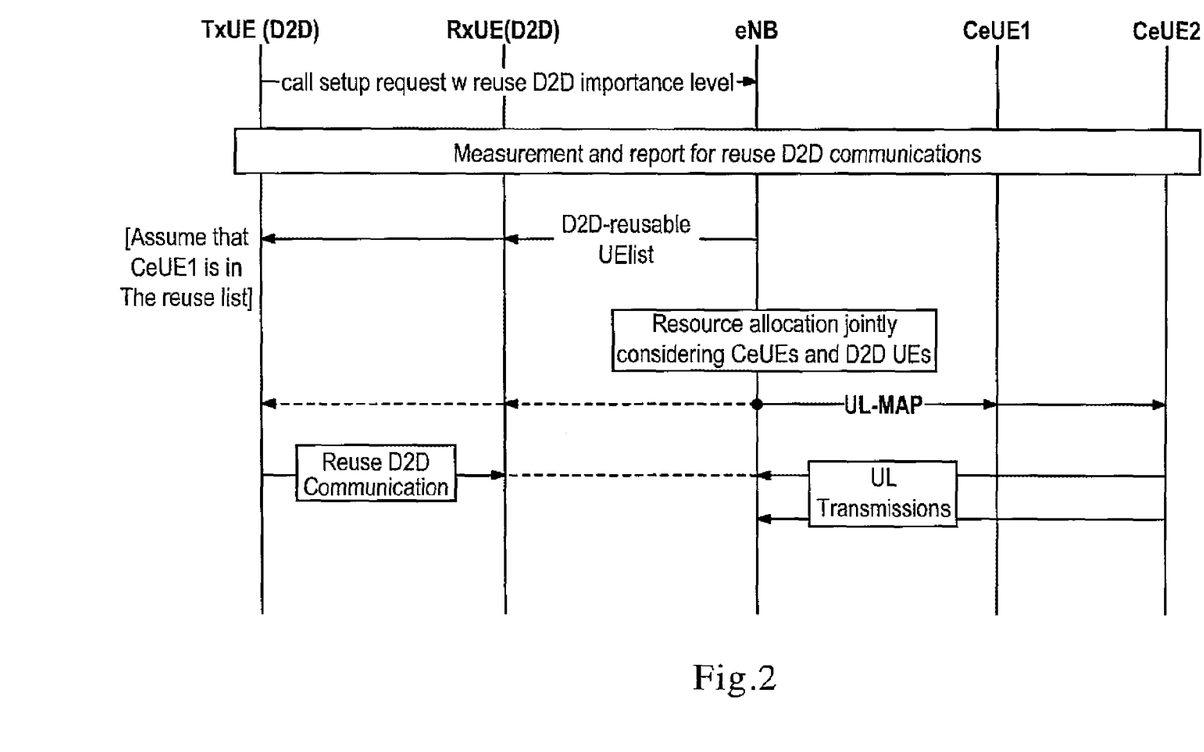
FIG. 2 provides a signaling flowchart example of a reuse D2D setup process.

In FIG. 2, a signaling flowchart example of a reuse D2D setup process is shown, including both the signaling of the conventional cellular UE (CeUE) and the D2D related procedures. In the example of FIG. 2, a reuse D2D importance level is proposed to the eNB together with the call setup request (which can also be sent to the eNB in an independent message after reuse D2D is decided and notified to D2D UEs). Then, after UE measurements and reports, the eNB can generate a D2D reusable UE list for each D2D pair and send a notification of the list to them. Finally, reuse D2D communication can be performed. Based on the received D2D importance level, eNB can jointly consider cellular UEs and reuse D2D UEs in its resource allocation.

It should also be noted that "D2D-reusable UE list" can also be updated during a D2D session due to the mobility of UEs. A simple method is to update the old reuse list by using a complete new "D2D-reusable UE list" message. The D2D UE can use the newly notified reuse list, which takes the place of the old one, after receiving the new list. Alternatively, only changes of the reuse list can be sent to the reuse D2D UE, thereby reducing signaling overhead. In this case, the message shown in FIG. 1 could further contain maintenance information for the reuse list at D2D UE. For example, an extra 1-bit field can be added in each UE ID in "UE ID List" to indicate an "addition" or "deletion" option for the corresponding UE in the reuse list. Although the information in each UE ID is 1-bit larger, the number of UE ID may be reduced, because the UE ID already known at D2D UE without any change would not need to be contained in the message.

In order to jointly consider cellular UEs and reuse D2D UEs in its resource allocation, the eNB need to adjust its resource allocation of cellular UEs so that both cellular and D2D links can be satisfied. An enhanced proportional fairness scheduling algorithm can take into account of both cellular and D2D links.

In a conventional cellular cell, resource allocation generally can be divided into 2 steps: (Step 1) the guaranteed data rate is considered for each cellular link in a priority order; and (Step 2) if there are still resources free for allocation, the rest of radio resources can be allocated to different UEs according to different criteria, such as maximal capacity, strict user fairness, or proportional fairness considering both capacity and user fairness.

Enhancements, however, are possible for both Step 1 and Step 2. In Step 1, some enhancement can be achieved by taking into account importance levels of reuse D2D UEs. For example, if the reuse D2D importance level is larger than 1, reuse D2D links will be considered in advance of cellular links. When radio resources are allocated to a reuse D2D UE, cellular UEs in its assigned D2D reusable UE list will be considered (according to a priority order as same as before) and one of them will be selected to reuse that part of allocated resources. Both cellular UE and D2D UE can then be allocated with same (reused) resource, and their requested data-rate guarantees can be updated correspondingly. When a cellular UE is allocated with radio resource, the D2D link whose reuse list contains that cellular UE can update their requested data-rate guarantees correspondingly. Moreover, it is possible that several D2D links can reuse the resource of the same cellular UE. In this case, all the related D2D links can update their requested data-rate guarantees as well, before the next-step resource allocation.

In Step 2, resource allocation may be more flexible due to different criteria. Here, proportional fairness (PF) can be used as the resource allocation criterion for the joint-allocation example. It should be noted that "each D2D link," as used herein, refers to a unidirectional D2D link from a transmission D2D peer to the receiving D2D peer. In the proposed allocation method, an importance coefficient $\alpha_i$ can be defined for each reuse D2D link according to the proposed "reuse D2D importance level," where $\alpha_i \in [0, 2]$.

If $\alpha_i=1$, the reuse D2D link can be given the same importance as the cellular links and can participate in PF resource allocation the same as a cellular link. While when $\alpha_i=0$, the reuse D2D link may not be considered at all in the PF resource allocation, and may only reuse the resource reusable opportunistically after cellular UEs' allocation. Therefore, the procedures of the enhanced PF resource allocation may be as in the follow examples.

Step 2.1 Resource in allocation is allocated to the cellular UE or the D2D pair who fulfills the equation $$\arg\max_i \left( \frac{\alpha_i r_i}{R_i} \right)$$

where $r_i$ is the achievable instantaneous data rate in the ith link, and $R_i$ is the average data rate of ith link. It should be noted that both cellular UEs and D2D UEs can participate in the comparison, and $\alpha_i=1$ for each cellular link.

Step 2.2 If the maximal-value link is a cellular link, this specific cellular UE can be allocated with the resource. Correspondingly, its paired D2D UEs, who can re-use this specific UE's resource, can be allocated with same resource. Hence, $R_i$ of both cellular UE and D2D can be updated for further scheduling.

Step 2.3 Vice versa if the maximal-value link is a reuse D2D link, this specific D2D can be allocated with the resource. Correspondingly, a small-scale PF allocation can be performed among its paired cellular UEs whose resource could be reused by this specific D2D. Finally, only a single paired cellular UE can be allocated with same resource. Again, $R_i$ of both cellular UE and D2D can be updated for further scheduling.

Step 2.4 Go to Step 2.1, above, for a new resource to be allocated.

Using a method such as described above, both reuse D2D and cellular links can be jointly considered in enhanced PF resource allocation and some high-level services can be supported in the enhanced reuse D2D links. In the case that several D2D links reuse the resource of a same cellular UE, all the related D2D links can update their average data rate $R_i$ as well, before the next-step resource allocation.

If the resource allocation is aiming to maximize the overall throughput in Step 2, eNB would select a resource owner (either a cellular UE, or a paired reusing group containing a cellular UE and one or more D2D UEs) which can achieve the highest aggregated throughput. Then the resource could be allocated to the selected cellular user via the resource grant signaling. Accordingly, the corresponding D2D UEs would reuse the resource with no need of extra scheduling signaling.

By centralized eNB coordination and control, the embodiments above may have various advantages relative to a distributed reuse D2D mode. For example, the embodiments may speed up reuse D2D call set up. Because no CTS/RTS handshake is needed, large call-setup latency due to CTS/RTS contention can also be avoided.

Additionally, more flexible coordination may be possible using centralized eNB coordination and control. When two reuse D2D links in the same area request their setup simultaneously, only one D2D link will finally be set up in an RTS/CTS handshake. The other D2D link will have to perform its measurement again and try its luck in a later RTS/CTS handshake on other possible reuse resources if available, or wait for another round to compete resources and win the D2D link. However, in an eNB coordination method, both reuse D2D links may be setup simultaneously using, for example, an orthogonal reuse list of cellular UEs Certain embodiments of the present invention may provide resource saving. For example, if an CTS/RTS exchange is made between two D2D UEs, it may need to occupy an orthogonal common channel. Once the D2D link is set up, however, the CTS/RTS handshake is not needed any more. Hence, allocating a dedicated common channel for CTS/RTS exchange may be less resource-efficient than certain embodiments of the present invention. In a centralized approach, no such channel is needed. Hence, a centralized approach can be more resource saving despite that the cellular link for reuse-D2D setup signaling can be much worse than direct D2D links.

In addition, compared with conventional cellular scheduling, eNB-controlled reuse D2D does not necessarily require any special D2D scheduling signaling, and consequently can save the scarce PDCCH resources, the same as in a distributed solution.

Additionally, since the eNB is aware of reuse D2D, service charge for D2D links becomes possible. This may be preferable from the operators' point of view.

Furthermore certain embodiments of the present invention may provide enhanced reuse D2D for supporting high-level services. In decentralized D2D reuse, the D2D UE can only opportunistically communicate with each other when a resource suitable to be reused comes along. Hence, the reuse D2D link may not be good enough for high-level services. The "D2D reuse importance level" discussed above can help to improve the eNB resource allocation so that a reuse D2D link can be jointly considered together with the cellular UEs. As a result, the reuse D2D link can be enhanced to support some high-level services. Correspondingly, a different service charge can be applied as well for the reuse-D2D communications.

Besides weighting resource allocation for different D2D links, "D2D reuse importance level" can also be used in the reuse-list decision at eNB. For example, if two D2D pairs are requesting D2D setup, the one with higher "D2D reuse importance level" can get a larger number of cellular UEs to reuse. As eNB has the knowledge of both cellular UEs' and D2D UEs' traffic request, it may be easy to decide a reasonable reuse list for each D2D link with a different request.

Although some enhancements may be needed at both the eNB and the D2D UE to implement certain embodiments of the invention, these enhancements can be made. For example, in certain instances, a software upgrade can permit hardware of an eNB or D2D UE to be reconfigured to perform a method such as one of the method described above.

The list of reusable resources may also have various benefits. Once a D2D UE gets a configured reusable resource list, the D2D UE can autonomously decide whether to transmit or not for each Transmission Time Interval (TTI) without any D2D scheduling signaling. This may be possible, because the D2D UE can derive their transmission time according to the cellular UEs' UL grants in each TTI and the previously received D2D-reusable UE list.

Figure 3:
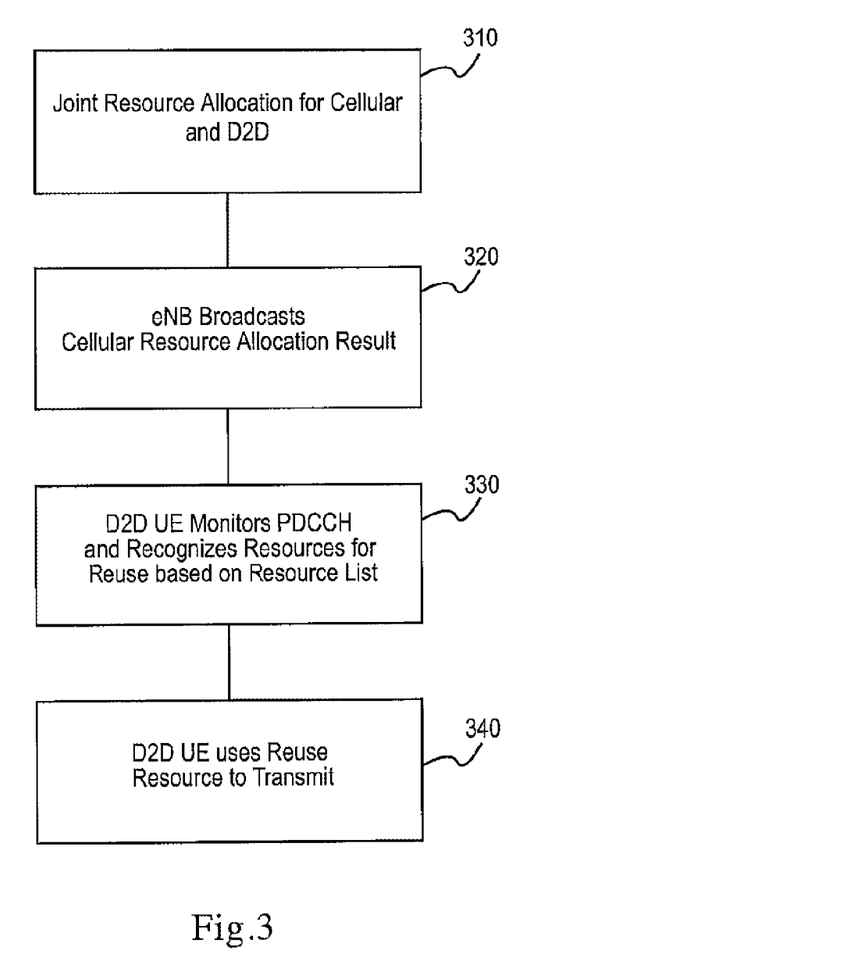
FIG. 3 illustrates a method of a system according to certain embodiments of the present invention.

FIG. 3 illustrates a method of a system according to certain embodiments of the present invention. In the illustrated method, joint resource allocation 310 can be performed by an eNB for cellular and D2D user equipment. Next, an eNB can broadcast 320 a cellular resource allocation result of the allocation 310. Responsive to the broadcast 320, D2D UE can monitor 330 PDCCH and recognize resources for reuse based on reuse list. Finally, based on the monitoring 330, the D2D UE can use 340 reuse resources to transmit on a D2D connection.

The above discussion explains implementations in which only uplink (UL) cellular resources are allowed to be reused by D2D nodes. However, one of ordinary skill in the art may appreciate the ways in which the above embodiments can be modified to address embodiments in which downlink (DL)

cellular are allowed to be reused by D2D nodes, either as an alternative to UL resources, or in addition to UL resources.

Figure 4:
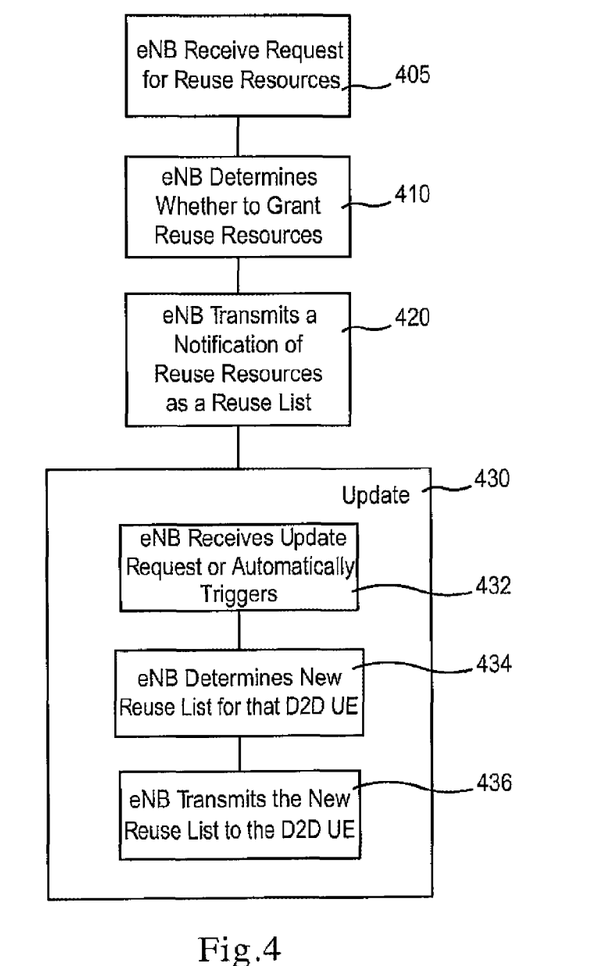
FIG. 4 illustrates a method according to certain embodiments of the present invention.

FIG. 4 illustrates a method according to certain embodiments of the present invention. As illustrated in FIG. 4, the method, which can be performed by, for example, an eNB, can include determining 410 whether to grant reuse resources to a device-to-device connection based on reviewing by priority at least one request 405 for device-to-device connection resources. The reuse resources can include at least one uplink channel to be used by a user equipment during a time period, but can instead simply be indicated at the resolution of the UE rather of a particular channel of the UE.

The determining 410 whether to grant reuse resources can include consideration of a device-to-device reuse importance level and that level can range from 0 to 2, where 1 is equal parity between the connection and cellular connections, 0 is the lowest priority, and 2 is the highest priority. The determining 410 whether to grant reuse resources can also include considering relative priority of a device-to-device connection to at least one of a cellular connection or another device-to-device connection. The algorithms discussed above may be employed in such a determination.

The method can also include initiating transmission 420 of a notification of device-to-device reusable resources in response to the at least one request. It should be noted that the eNB can actively adjust the resource allocation of cellular UEs so that QoS requirements for D2D UEs can be satisfied in certain embodiments. In certain cases no separate reuse-list is provided, but instead the D2D UEs recognize the reuse resources by monitoring allocation information in the PDCCH. The notification can be configured to identify the reusable resources available during the time period.

The transmission 420 can be a multicast transmission or a unicast transmission. The notification can include a list of user equipment for which a permission status for reuse is indicated. The permission status can either indicate that the user equipment may be reused or may not be reused. A negative permission list may simply exclude certain user equipment's resources from reuse, whereas a positive permission list may indicate that certain user equipment's resources can be reused. Of course, a list can state both which resources are permitted and which are forbidden. The method can optionally further include an update 430 procedure. The update 430 can, in some embodiments, simply indicate changes from a previous notification. The update 430 can include the eNB receiving 432 an update request from a particular D2D UE or automatically triggering an update procedure according to Quality of Service (QoS) monitoring. The update 430 can also include the eNB determining 434 a new reuse list for that D2D UE. The update 430 can further include the eNB transmitting 436 the new reuse list to the D2D UE.

Figure 5:
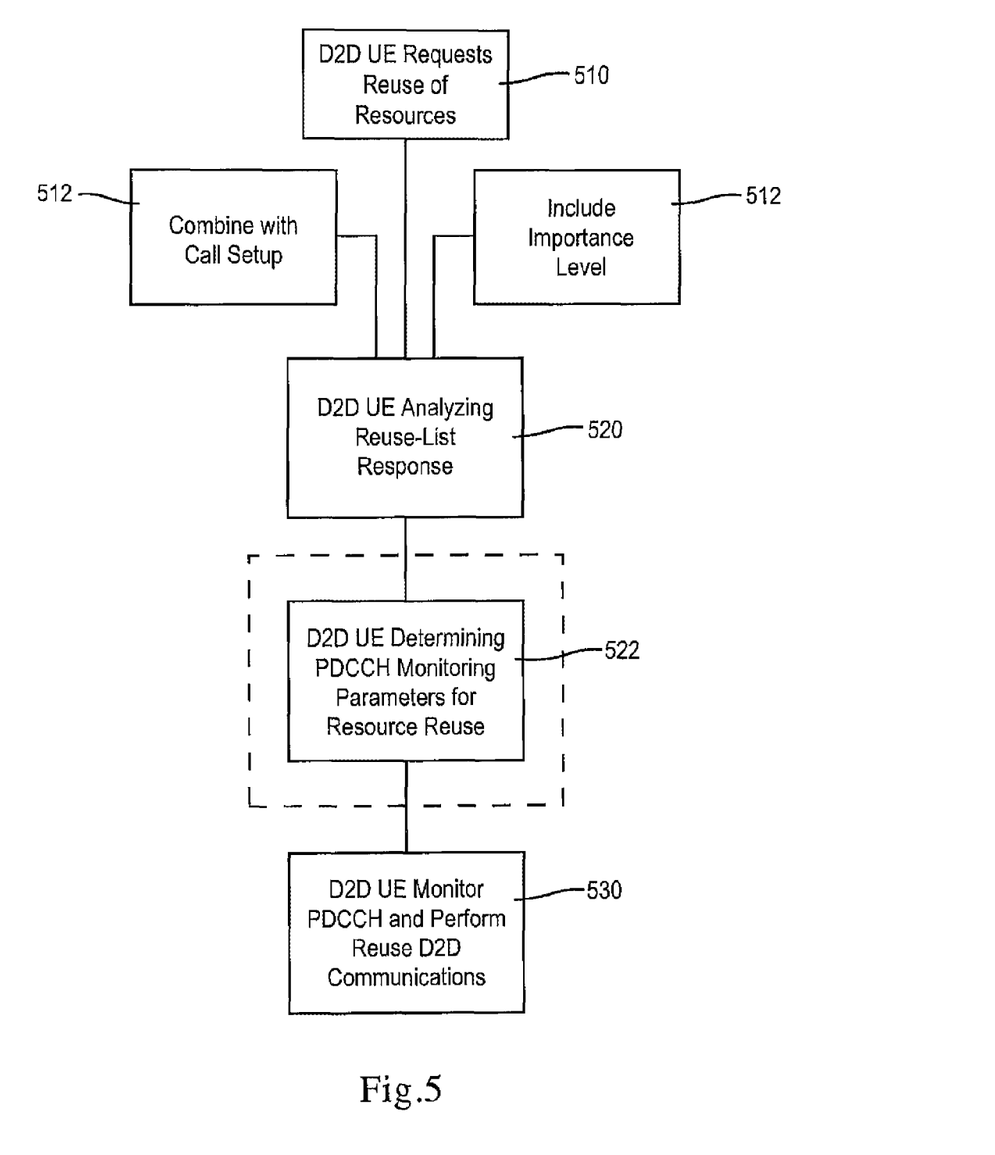
FIG. 5 illustrates another method according to certain embodiments of the present invention.

FIG. 5 illustrates another method according to the present invention. As illustrated in FIG. 5, the method (which can be performed by, for example, a D2D UE) can include initiating a request 510 for reuse resources for a device-to-device connection. The method can optionally include combining 512 the request with a call setup request. The method can also or alternatively optionally involve including 514 in the request a device-to-device reuse importance level. The device-to-device reuse importance level can be configured to indicate a relative priority of a device-to-device connection to at least one of a cellular connection or another device-to-device connection.

The method can also include analyzing 520 a notification received responsive to the request and based on a priority to determine reusable resources. The notification can be a reuse-list response. The notification can include a list of user equipment. The notification can include a list of user equipment for which a permission status for reuse is indicated.

The method can further include initiating a device-to-device connection after determining reuse-D2D communication 530 based on analysis of the notification. The method can optionally further include determining 522 PDCCH monitoring parameters for resource reuse, which can provide transmission parameters for the direct-to-direct connection including at least one of a transmission channel or transmission time period based on observation of a user equipment in the list of user equipment.

Figure 6:
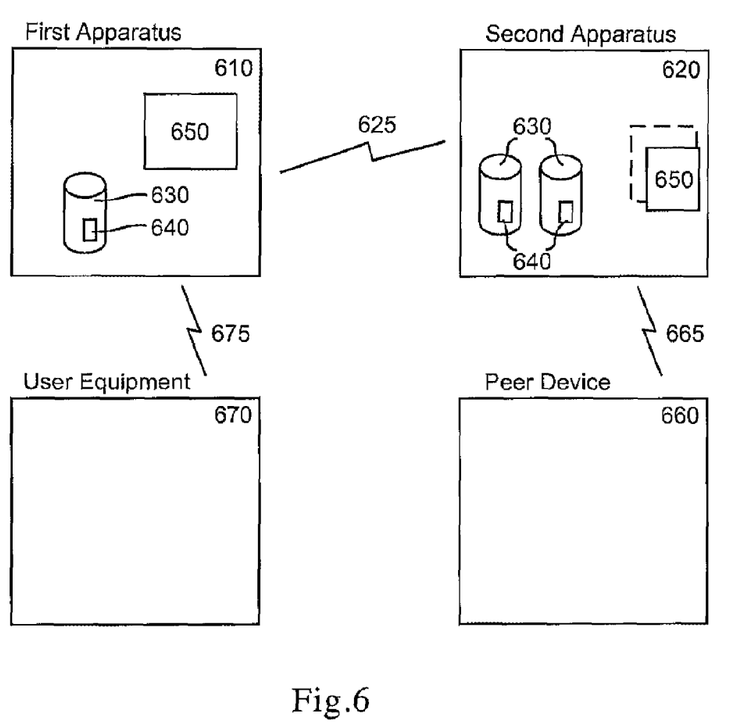
FIG. 6 illustrates a system according to an embodiment of the present invention.

FIG. 6 illustrates a system according to certain embodiments of the present invention. The system of FIG. 6 includes a first apparatus 610, which may be a base station such as an eNB. The system of FIG. 6 also includes a second apparatus 620, which may be a user equipment, such as a 3G cellular phone that is capable of reuse D2D communication. The first apparatus 610 and the second apparatus 620 may be connected to one another over a wireless radio link 625.

The first apparatus 610 and the second apparatus 620 may each include at least one memory 630 including computer program code 640, as well as at least one processor 650. The memory 630, computer program code 640, and processor 650 can be configured to cause the first apparatus 610 or respectively the second apparatus 620 at least to perform a method, such as the methods discussed in relation to FIG. 4 and FIG. 5 above. Of course, they may also cause other operations in addition to those discussed above.

The system of FIG. 6 also includes a peer device 660 and a user equipment 670. The peer device 660 may ultimately be connected to the second apparatus 620 over a direct wireless link 665. The peer device 660 may have a similar construction to second apparatus 620.

The user equipment 670 may be connected to the first apparatus 610 over a cellular link 675. The direct wireless link 665 may reuse resources of the cellular link 675. The user equipment 670 can be of similar construction to the second apparatus 620, but is not required to be capable of device-to-device communication.

Figure 7:
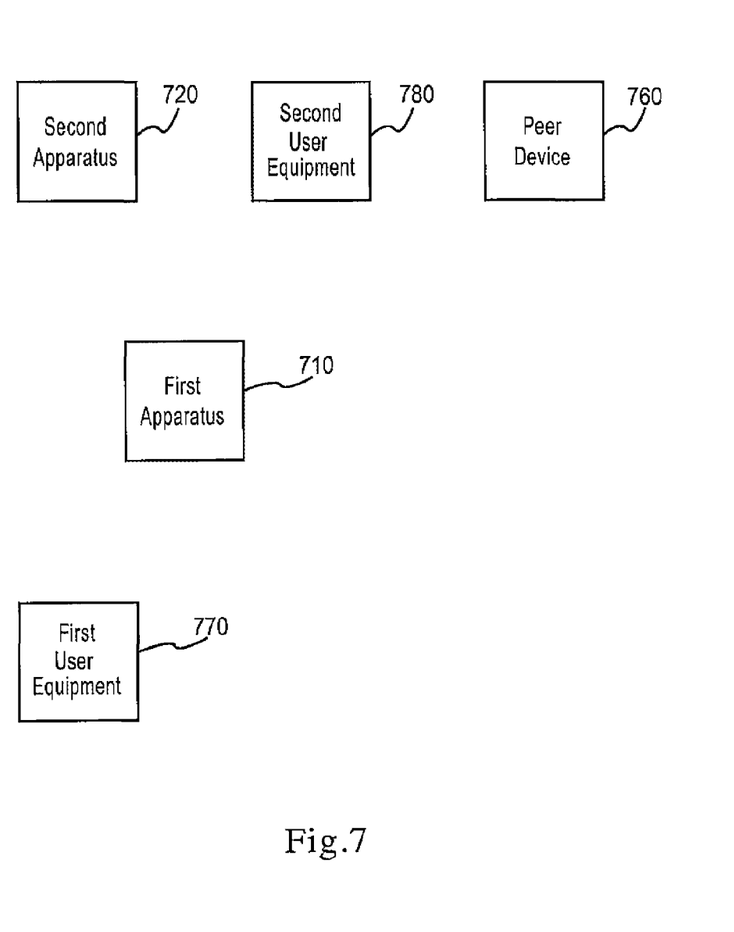
FIG. 7 illustrates a system according to another embodiment of the present invention.

FIG. 7 illustrates a system according to another embodiment of the present invention. The system is shown in top view. The system of FIG. 7 includes a first apparatus 710, a second apparatus 720, a peer device 760, a first user equipment 770, and a second user equipment 780.

The peer device 760 may ultimately be connected to the second apparatus 720 reusing the uplink radio resources of the first user equipment 770, which is far from the second apparatus 720 and peer device 760, but not of the second user equipment 680, which close to the second apparatus 720 and peer device 760.

Additionally, the above discussion has been presented from the standpoint of the centralized control taking place in the eNB. Other implementations are possible. For example, rather than centralizing the control in the eNB, the control could be centralized in another network element. In certain embodiments, for example, a wireless router node or cluster head node could similarly provide centralized control, although additional signaling would be required.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

For example, the above description is based on LTE, but in principle can be applied to other systems as well, e.g. WiMAX. In order to determine the metes and bounds of the invention, therefore, reference should be made to the appended claims.

What is claimed is:

1. A method, comprising:
   determining whether to grant reuse resources, comprising resources currently being used for a cellular connection, to a device-to-device connection based on reviewing by priority at least one request for device-to-device connection resources, wherein the reuse resources comprise at least one uplink channel to be used by a user equipment during a time period; and
   initiating transmission of a notification of device-to-device reusable resources in response to the at least one request, wherein the notification contains configuration information to identify the reusable resources available during the time period,
   wherein reviewing by priority comprises considering a relative priority of the device-to-device connection to at least one of the cellular connection or another device-to-device connection.

2. The method of claim 1, wherein the determining whether to grant reuse resources comprises consideration of a device-to-device reuse importance level, or wherein the determining whether to grant reuse resources comprises considering relative priority of a device-to-device connection to at least one of a cellular connection or another device-to-device connection.

3. The method of claim 1, further comprising:
   notifying the user equipment of resources, wherein the resources are reusable for the device-to-device connection.

4. The method of claim 1, wherein the notification comprises a list of user equipment for which a permission status for reuse resources is indicated.

5. A method, comprising:
   initiating a request for reuse resources, comprising resources currently being used for a cellular connection, for a device-to-device connection;
   analyzing a notification received responsive to the request and based on a priority to determine reusable resources, wherein the notification comprises a list of user equipment; and
   initiating a device-to-device connection based on analysis of the notification,
   wherein the reuse resources comprise at least one uplink channel to be used by the user equipment during a time period, and
   wherein the method further comprises including in the request a device-to-device reuse importance level, wherein the device-to-device reuse importance level is configured to indicate a relative priority of the device-to-device connection to at least one of the cellular connection or another device-to-device connection.

6. The method of claim 5, further comprising: combining the request with a call setup request.

7. The method of claim 5, wherein the notification comprises a list of user equipment for which a permission status for reuse is indicated.

8. The method of claim 5, further comprising:
   determining transmission parameters for the direct-to-direct connection including at least one of a transmission channel or transmission time period based on observation of a user equipment in the list of user equipment.

9. An apparatus, comprising:
   at least one memory including computer program code; and
   at least one processor,
   wherein the at least one memory and the computer program code are configured to, with the at least one processor, cause the apparatus at least to
   determine whether to grant reuse resources, comprising resources currently being used for a cellular connection, to a device-to-device connection based on reviewing by priority at least one request for device-to-device connection resources, wherein the reuse resources comprise at least one uplink channel to be used by a user equipment during a time period; and
   initiate transmission of a notification of device-to-device reusable resources in response to the at least one request, wherein the notification contains configuration information to identify the reusable resources available during the time period,
   wherein reviewing by priority comprises considering a relative priority of the device-to-device connection to at least one of the cellular connection or another device-to-device connection.

10. The apparatus of claim 9, wherein determination of whether to grant reuse resources comprises consideration of a device-to-device reuse importance level, or wherein determination of whether to grant reuse resources comprises considering relative priority of a device-to-device connection to at least one of a cellular connection or another device-to-device connection.

11. The apparatus of claim 9, wherein the transmission comprises a multicast transmission or a unicast transmission.

12. The apparatus of claim 9, wherein the notification comprises a list of user equipment for which a permission status for reuse resources is indicated.

13. An apparatus, comprising:
    at least one memory including computer program code; and
    at least one processor,
    wherein the at least one memory and the computer program code are configured to, with the at least one processor, cause the apparatus at least to
    initiate a request for reuse resources, comprising resources currently being used for a cellular connection, for a device-to-device connection;
    analyze a notification received responsive to the request and based on a priority to determine reusable resources, wherein the notification comprises a list of user equipment; and
    initiate a device-to-device connection based on analysis of the notification,
    wherein the reuse resources comprise at least one uplink channel to be used by the user equipment during a time period, and
    wherein the at least one memory and the computer program code are also configured to, with the at least one processor, cause the apparatus at least to include in the request a device-to-device reuse importance level, wherein the device-to-device reuse importance level is configured to indicate a relative priority of the device-to-device connection to at least one of the cellular connection or another device-to-device connection.

14. The apparatus of claim 13, wherein the at least one memory and the computer program code are also configured to, with the at least one processor, cause the apparatus at least to combine the request with a call setup request.

15. The apparatus of claim 13, wherein the notification comprises a list of user equipment for which a permission status for reuse is indicated.

16. The apparatus of claim 13, wherein the at least one memory and the computer program code are also configured to, with the at least one processor, cause the apparatus at least to determine transmission parameters for the direct-to-direct connection including at least one of a transmission channel or transmission time period based on observation of a user equipment in the list of user equipment.

17. A non-transitory computer-readable medium, encoded with instructions that, when executed in hardware, perform a process, the process being the process of claim 1.

* * * * *